Nov. 6, 1934.       J. D. BOOTH       1,979,669
MODULATION METER
Filed July 18, 1930
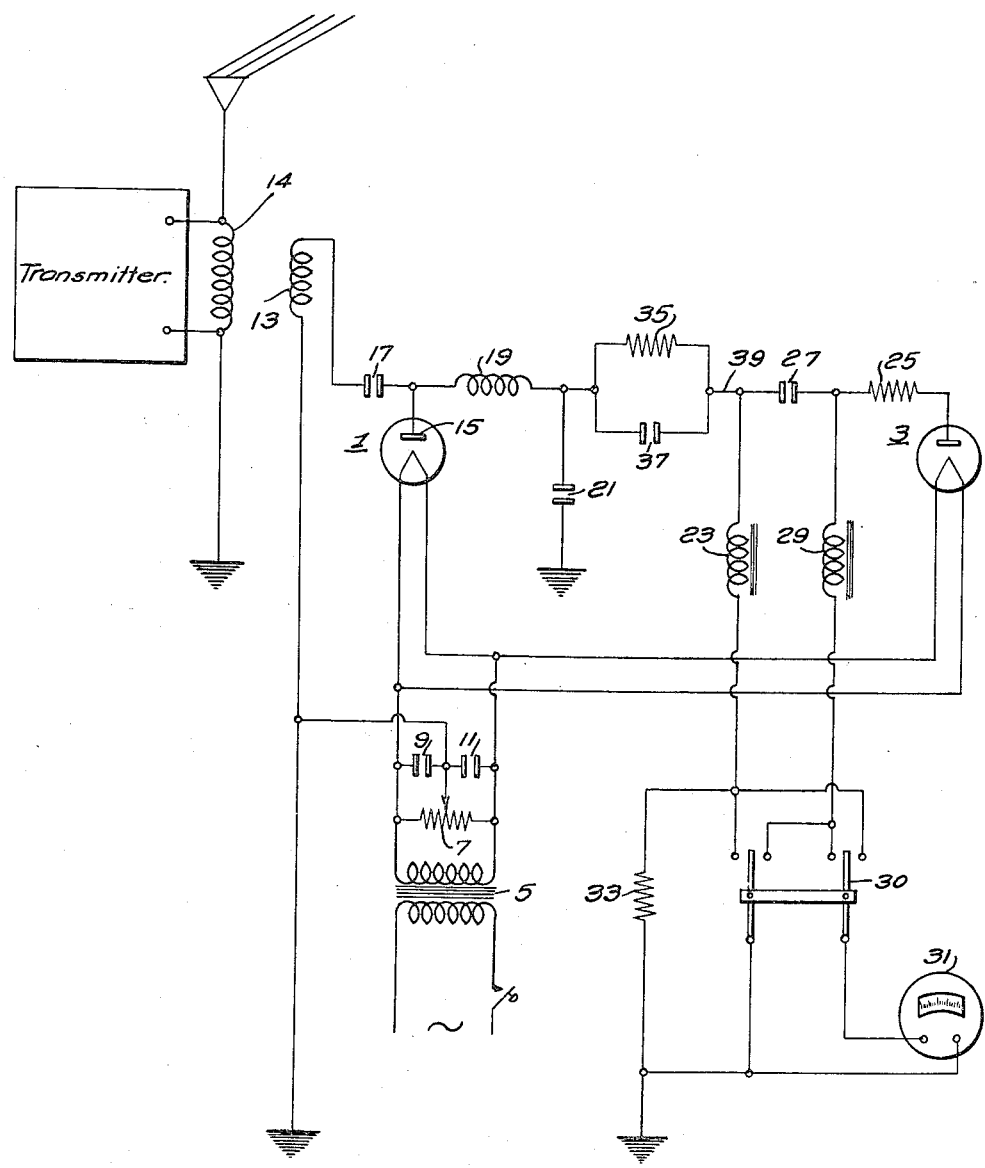
INVENTOR
James D. Booth
BY
Wesley G. Carr
ATTORNEY Patented Nov. 6, 1934

1,979,669

UNITED STATES PATENT OFFICE 1,979,669

MODULATION METER

James D. Booth, Longmeadow, Mass., assignor to Westinghouse Electric & Manufacturing Company, a corporation of Pennsylvania Application July 18, 1930, Serial No. 468,855

7 Claims. (Cl. 179—171)

My invention relates to a modulation-indicating system and more particularly to a novel circuit arrangement and metering means for directly measuring the per cent modulation of current in a transmitting circuit or the like.

If a modulated radio-frequency voltage is so rectified that the rectified current is directly proportional to the applied voltage, the ratio of the peak value of the audio-frequency component to the average value of the carrier-wave component is a true measure of the per cent of modulation, as defined by the Institute of Radio Engineers.

In present day practice, the radio-frequency component of a rectified modulated carrier wave is filtered out and the resultant combination of direct and audio-frequency current is applied to an oscillograph. This method, however, is limited, in its scope, by the physical characteristics of the oscillograph, as the oscillograph can measure with any degree of accuracy only those currents of frequencies between 10 and 200 cycles. Above the 200 cycle limit, in the results obtained by an oscillograph, large errors are found to exist because of the limitations referred to above.

It is an object of my invention to provide a means for indicating the modulation characteristic of currents over a wide band of frequencies, including both radio and audio frequencies.

Another object of my invention is to provide a current-modulation indicator of great accuracy and dependable operation.

A further object of my invention is to provide a simple and compact apparatus to accomplish the above objects.

Additional features involved will be described and pointed out in the following description, in conjunction with the accompanying drawing wherein the single figure represents a circuit embodying my invention.

In the system disclosed, I provide a pair of uni-directional-current valves comprising rectifier tubes 1 and 3 and relate them in such manner in the circuit as to cause a modulated carrier current, which has been impressed on the circuit, to be resolved into its various components, the component in the circuit of one of the rectifiers bearing such relationship to that in the other tube circuit as to serve as an indication of the modulation characteristic of the modulated carrier wave.

Filament current to the rectifying tubes is supplied, from an alternating-current source, through a transformer 5, the electrical center of which, determined by the midpoint of a shunting resistor 7 and a pair of similar serially connected shunting capacities 9 and 11, is grounded. Any other convenient source of filament-supply current may be used, however, without affecting the operation of the system.

To cause a modulated current, which is to be measured, to be impressed on the circuit, I provide an exploring or pick-up coil 13 which may be located in any suitable position with relation to a current-modulating circuit 14. The coil 13 constitutes the input circuit of one of the rectifying tubes, one terminal being connected to the anode 15 through a blocking condenser 17, and the other terminal being grounded to the midpoint of the filament-supply circuit. By altering the position of the coil with respect to the current-modulating circuit, the input to the rectifying tube may be varied to obtain suitable values for measurement purposes.

The above rectifying tube serves to rectify or detect the impressed modulated carrier wave, whereby a direct current comprising one half of the wave, is caused to flow in the output circuit of the tube.

A radio-frequency choke coil 19 and a by-pass condenser 21 in the output circuit referred to, together, constitute a filtering means whereby the radio-frequency component of the rectified modulated carrier wave is separated from the current in the output circuit, leaving only the direct-current and audio-frequency components from which measurements of percentage modulation may be derived.

The combination of audio-frequency and direct-current is further broken up into its components, the direct-current component being forced to take a path through a circuit to ground through an audio-frequency choke coil 23 of approximately 30 henries which functions to block out the audio-frequency component, thereby insuring substantially pure non-fluctuating direct current in that circuit. This current is proportional, in value, to the average value of the carrier wave.

A path for the audio-frequency component is provided through a second rectifier or detector 3 by way of a resistor 25 and condenser 27 in the plate lead, the condenser 27 serving as a blocking means for the direct-current component.

In parallel with the second detector, from a point intermediate the blocking condenser 27 and the plate resistor 25 to ground, I provide another audio-frequency choke coil 29 of approximately 100 henries. The direct-current component of the rectified audio-frequency current, through the second detector, will find a relatively low-resistance direct-current path through the choke coil and this current, for high values of the plate resistor 25 of approximately 1000 ohms, would be proportional to the average peak value of the audio-frequency component current.

As stated, heretofore, the ratio of the average peak value of the audio-frequency component of a modulated carrier wave to the average value of the carrier wave will give a true measure of the modulation characteristic of the modulated wave. Therefore, if, instead of the actual peak values and carrier-current values, proportional values are substituted, the results will be the same, and the ratio will still serve as an indication of the current-modulation characteristic. Accordingly, it will be noted that, since the currents in the respective rectifier-tube circuits represent proportionate values, as pointed out, the relative values of the currents will serve as an indication of the modulation characteristic of the current induced from a modulating circuit.

If the reference current, that is, the current through the first choke coil 23, could be maintained at a uniform value, then a meter 31 inserted in series with the second choke coil 29 could be calibrated to read, directly, the percentage modulation of the current in a modulating circuit.

To determine the relative value of the reference current and, if necessary, adjust it to its proper value by altering the position of the pick-up coil with reference to the modulating circuit, I provide a switch 30, whereby a single meter 31 or other measuring device may be selectively connected in either the first choke-coil circuit or the circuit of the second choke-coil.

A reference mark on the meter scale may be used to indicate the proper adjustment of the reference current, after which a proper calibration of the meter, in terms of percentage modulation, will give accurate readings of the modulation characteristic of a modulated current when the meter is connected in series with the second choke coil.

A meter-shunt resistance 33, it will be noted, is permanently connected in the circuit of the first choke-coil or reference-current circuit. The meter, therefore, will utilize the shunt only when the meter is connected in the circuit of the first choke-coil. By adjusting the value of the shunt, it will be possible to locate the reference point on the meter at any convenient and desirable spot prior to calibration of the meter.

From the above description of my invention, it will be apparent that the circuit and apparatus disclosed by me will fulfill the objects of my invention. Since the meter readings are substantially independent of frequency, the limits of operation of my invention extend far beyond those wherein an oscillograph is utilized as the measuring or indicating means. The circuit arrangement is very simple, and dependable in operation, being capable of reading percentage modulation to an accuracy of approximately plus or minus five per cent.

Various modifications and changes may be suggested which lie within the contemplated scope of my invention. I have found, for example, that, by inserting a filter comprising a resistor 35 of approximately 345 ohms and a capacity 37 of approximately .16 microfarads in parallel relationship in the common lead 39 to the choke-coil circuits, the audio-frequency characteristic of the second detector may be materially improved.

Other rectifying or detecting devices might be utilized in lieu of the tubes disclosed by me above, or I might substitute for the metering means shown, any measuring device capable of performing the functions desired. A thermo-couple meter may be mentioned as an illustration. My invention is also not to be limited to the use of two-element tubes, as I consider it within the scope of my invention to use three and four-element tubes, which I have found to operate satisfactorily for the purpose.

Therefore, while I have disclosed my invention in great detail, I do not desire to be limited to such except insofar as is necessitated by the prior art and the spirit of the appended claims.

I claim as my invention:

1. A modulation-measuring system comprising a pair of current rectifying circuits, means for coupling at least one of said circuits to a current-modulating system, means for causing the rectified current of one circuit to bear such relationship to the rectified current of the other circuit that the ratio of the two currents serves as an indication of the modulation of the current in the modulating system and means for visually indicating said relationship.

2. A modulation-measuring system comprising a pair of rectifying means associated with a current-modulating system, circuits embodying said rectifying means for deriving two currents from a modulated wave, whose ratio is a measure of the per-cent modulation, a meter, means for selectively connecting said meter in the circuits of said rectifying means, the value of current in one circuit being capable of adjustment to give a reference indication on said meter, whereupon the current in the other circuit will serve to indicate on the meter the modulation characteristic of a current in the modulation circuit.

3. A modulation measuring system comprising means including a pair of rectifying circuits for deriving from a modulated wave, two currents whose ratio is a direct indication of the percent modulation and means for indicating said ratio.

4. In a modulation-measuring system, means for introducing a modulated carrier current in the system, rectifying means for removing the radio-frequency components, leaving a resulting component, comprising direct and audio-frequency components, means for isolating said audio-frequency component, and means for indicating the relative values of peak value of said audio-frequency component and said direct current.

5. The method of measuring modulation comprising splitting up a modulated carrier wave into radio frequency, audio frequency and direct current components, deriving a direct current from and proportional to the peak value of said audio frequency component, and comparing said derived direct current with said first mentioned direct current component.

6. A modulation measuring system comprising the combination of rectifying means for deriving the direct current component and audio frequency component of a modulated wave and means for indicating the ratio of the peak value of said audio frequency component to said direct current component.

7. A modulation measuring system comprising the combination of means for deriving a direct current and audio frequency component from a modulated wave and means for indicating the ratio of the peak value of said audio frequency component to said direct current component, said means including a circuit for deriving a direct current whose value is proportional to the peak value of said audio frequency component and a meter in said circuit.

JAMES D. BOOTH.